United States Patent [19]

Kobayashi

[11] 4,124,840
[45] Nov. 7, 1978

[54] ALARM SYSTEM

[75] Inventor: Kunimitsu Kobayashi, Yokohama, Japan

[73] Assignee: Shingo Kizai Kabushiki Kaisha, Japan

[21] Appl. No.: 689,049

[22] Filed: May 24, 1976

[30] Foreign Application Priority Data

Jan. 30, 1976 [JP] Japan .................................. 51-8959

[51] Int. Cl.$^2$ ............................................. B60Q 1/54
[52] U.S. Cl. .................................. 340/501; 324/160; 364/550; 340/53; 340/62; 340/670
[58] Field of Search ................. 340/213 R, 62, 53, 32, 340/262, 263, 248 A; 346/33 D; 235/92 TC, 92 FQ, 92 AE; 116/37, 38; 200/56 R, 56 A, 61.46, 160; 324/160, 161, 166; 364/424, 426, 438, 550

[56] References Cited

U.S. PATENT DOCUMENTS

| 3,024,443 | 3/1962 | Barker et al. | 340/62 |
| 3,504,337 | 3/1970 | Ekman | 340/62 |
| 3,691,525 | 9/1972 | McClellan | 340/62 |
| 3,744,043 | 7/1973 | Walden et al. | 340/213 R |
| 3,769,844 | 11/1973 | Skoures | 235/92 AE |
| 3,793,622 | 2/1974 | Hida et al. | 340/62 |
| 3,794,972 | 2/1974 | Van Ostrom | 340/62 |
| 3,919,688 | 11/1975 | Schick | 340/62 |

Primary Examiner—John W. Caldwell, Sr.
Assistant Examiner—Donnie L. Crosland

[57] ABSTRACT

An apparatus is provided which produces an alarm signal when the magnitude of a varying physical quantity such as the running speed of an automobile, for example, exceeds one of a plurality of preset threshold values. The apparatus includes detection means having a plurality of detection channels in which mutually different threshold values are defined and capable of producing an electrical output in response to the magnitude of the varying physical quantity exceeding a threshold value in each of the detection channels; selection means for selecting one of the threshold values and for providing an output signal indicative of the selected threshold value; and comparison and control means for comparing the output from the detection means and the output from the selection means to produce an electrical output when the magnitude of the physical quantity exceeds the threshold value selected by the selection means. The output of the comparison and control means represents an alarm signal which may be utilized by a variety of visual or acoustic devices or recorders.

9 Claims, 4 Drawing Figures

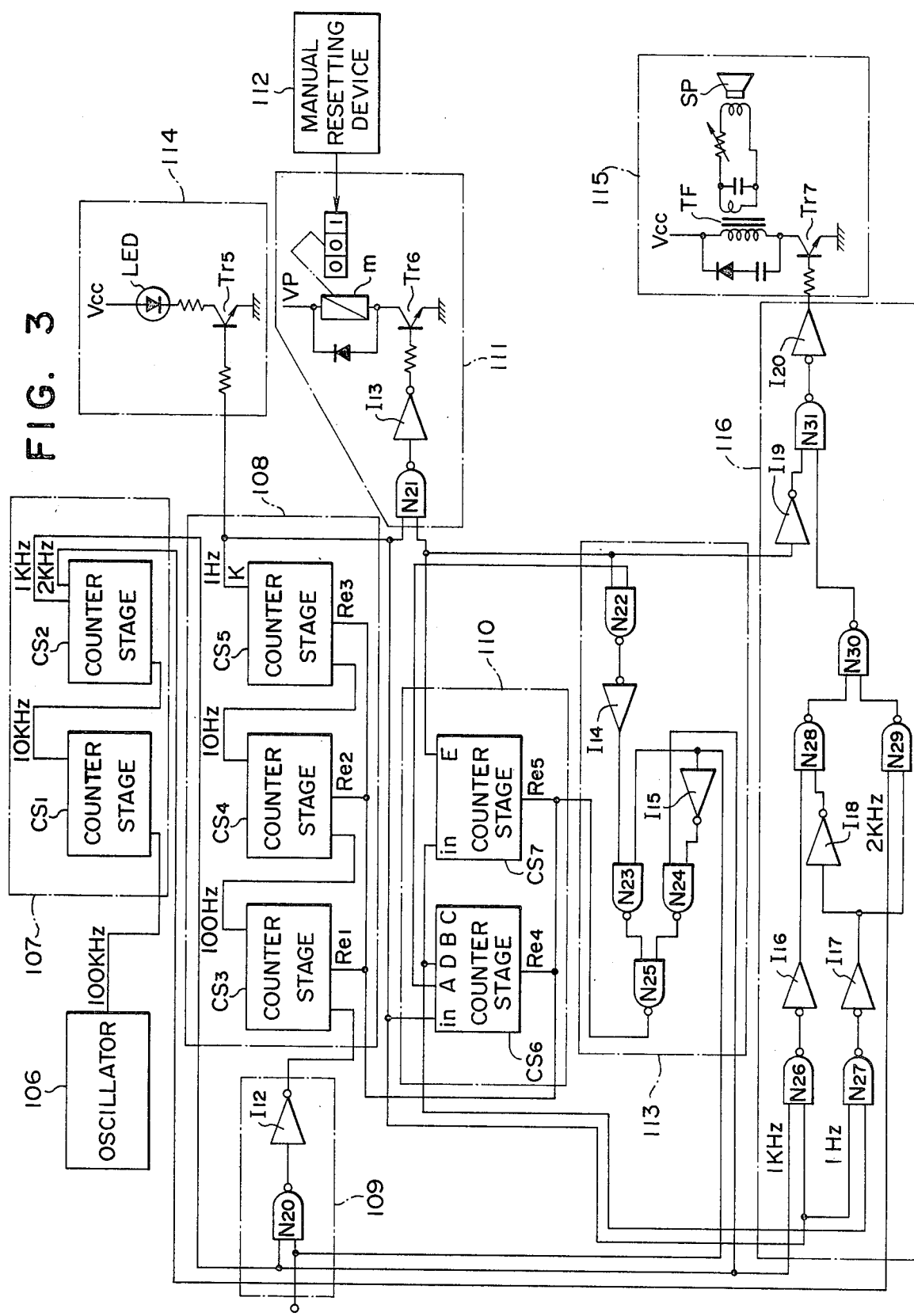

ALARM SYSTEM

FIELD AND BACKGROUND OF THE INVENTION

The invention relates generally to an alarm system, and more particularly to an apparatus which may be used to monitor the magnitude of a varying physical quantity such as the running speed of an automobile to produce an alarm when the speed exceeds a preset threshold value.

As is well recognized, most of automobile accidents are caused by a car driving at an improper running speed. While legal constraints are imposed on the car drivers as by traffic signs which indicate the speed limitations, the observation of the traffic rules is left to the discretion of the car drivers, and the speed limitation is frequently ignored. Though traffic control has been exercised to supervise the running speed of automobiles in a given interval or at a given point of the road so that any violation of the speed limitation may be punished. However, it is difficult to expect the psychological effect upon the car drivers of such traffic control throughout the entire car traffic way. On the other hand, there has been a proposal to incorporate a device on the automobile which is operative to produce an alarm when the running speed exceeds a preset threshold value, and several versions of such apparatus have been manufactured. In one construction, a sensor is mounted at a given position on the speedmeter of a car which corresponds to a given value, so that the detection of the pointer by the sensor activates a buzzer or indicator lamp. However, the known alarm apparatus operates on a single threshold value, which cannot be selectively changed in accordance with the different speed limitations on the individual roads.

SUMMARY OF THE INVENTION

Therefore, it is a general object of the invention to provide an alarm system capable of establishing a selective threshold value.

It is another object of the invention to provide an alarm system which is provided with a recorder for supervising the fact that a selectively established threshold value is exceeded.

It is a further object of the invention to provide an automotive alarm system which permits a free selection of the threshold value in accordance with the speed limitation of a particular road.

In accordance with the invention, there is provided an alarm system which supervises the running speed of a car on a particular road. Specifically, a superintendent office of a particular road issues a record medium such as card on which information is recorded to indicate a threshold value corresponding to the speed limitation on that road and which is handed over to a car driver at the inlet gate of the road. The card is adapted to record any violation of the speed limitation, and when the card is collected at the exit gate of the road, a traffic control can be effectively achieved over the full length of the road.

According to a further aspect of the invention, the alarm system may also comprise a buzzer or indicator lamp which is activated as the running speed of the car exceeds the established threshold value, and a counter capable of counting the number of times that the running speed exceeds the threshold value for a given time interval.

BRIEF DESCRIPTION OF THE DRAWINGS

FIG. 3 is a circuit diagram illustrating several manners of operation of utilization device shown in FIG. 1.

DETAILED DESCRIPTION OF PREFERRED EMBODIMENT

Figure 1:
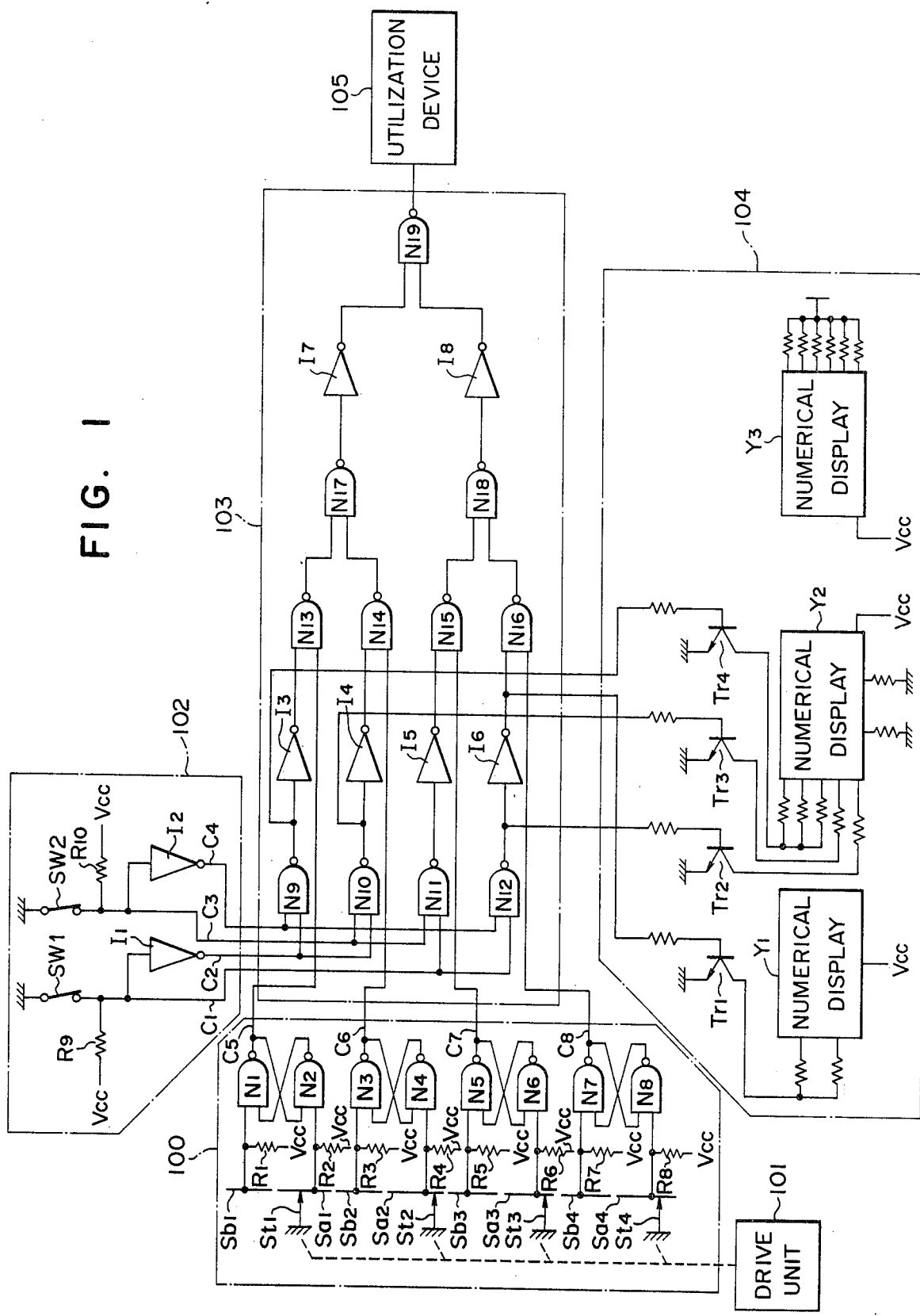
FIG. 1 is a circuit diagram of one embodiment of the alarm system according to the invention.

Referring to the drawings, there is shown an embodiment of the alarm system according to the invention which is adapted to be mounted on a automobile for supervision of its running speed. However, it should be understood that the invention is not limited to this application, but is generally applicable to the supervision or monitoring of the magnitude of any other varying physical quantity.

Referring to FIG. 1, the alarm system according to the invention includes a detection circuit 100 which detects the running speed of an automobile. As will be described more fully later, the system shown is designed to operate with four threshold values which can be selectively selected in a threshold selection circuit 102, and in this connection, the detection circuit 100 includes four movable contacts $St1$ to 4 which are mechanically interlocked with a drive unit 101 which may be any part of the automobile which is capable of movement in accordance with the running speed of the automobile. Each of these movable contacts is slidable on a pair of stationary contact bars $Sa1$ to $Sa4$ and $Sb1$ to $Sb4$, and cooperate with the latter to form an independent switch. Each movable contact is initially located on one of the stationary contact bars, $Sa$, but slides to the other contact bar $Sb$ as the running speed of the automobile reaches a threshold value which varies from switch to switch. Specifically, when the running speed reaches a first threshold value $V_1$ in accordance with a movement of the drive unit 101, the movable contact $St1$ moves from the stationary contact bar $Sa1$ to the other $Sb1$; when the running speed reaches a second threshold value $V_2$, the movable contact $St2$ moves from the contact bar $Sa2$ to the other $Sb2$; when the running reaches a third threshold value $V_3$, the movable contact $St3$ moves from the contact bar $Sa3$ to the other $Sb3$; and when the running speed reaches a fourth threshold value $V_4$, the movable contact $St4$ moves from the contact bar $Sa4$ to the other $Sb4$. When the running speed decreases below an associated threshold value, the corresponding movable contact returns to its initial position.

Figure 2:
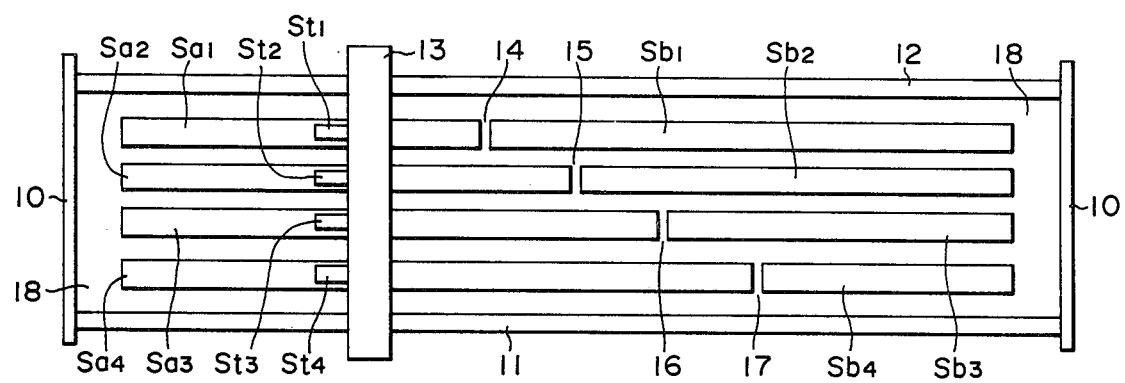
FIG. 2 is a plan view of a specific example of a detection switch shown in FIG. 1.

FIG. 2 shows one example of a switch assembly which can be operated in this manner. Referring to FIG. 2, the switch assembly comprises frame portions 10, 10 which are connected together by a pair of guide rails 11 and 12. A carriage 13 is mounted to be slidable along the guide rails, and carries the movable contacts $St1$ to $St4$. The pairs of stationary contact bars $Sa1$ to $Sa4$ and $Sb1$ to $Sb4$ are disposed in alignment with the path of movement of each movable contact, and are fixedly mounted and distributed on a common insulating plate 18 so that gaps 14 to 17 between the respective pairs of stationary contact bars $Sa$ and $Sb$ are at different positions from each other within the extent of movement of the carriage 13. Thus, it will be seen that by connecting the carriage 13 with the drive unit 101, such as the pointer of the speedmeter, which moves in accordance with the running speed of the automobile, the threshold values $V_1$ to $V_4$ can be established by the position of the gaps 14 to 17.

Returning to FIG. 1, each movable contact S$t$1 to S$t$4 are connected with the ground while the corresponding pair of stationary contact bars S$a$ and S$b$ are connected with the set input terminal and the reset input terminal of a flip-flop circuit, thus forming altogether an independing detection channel. In the present embodiment, each flipflop is formed by a pair of NAND gates N1 and N2, N3 and N4, N5 and N6 or N7 and N8, which are chosen in view of the low cost consideration of commercially available integrated circuits. In the description to follow, there appear other NAND gates, which however can be replaced by AND gates or other logical circuits. A control voltage Vcc is applied to each of the stationary contact bars S$a$1 to S$a$4 and S$b$1 to S$b$4 through resistors R1 to R8, respectively, so that an output line C5 to C8 of the respective flipflop circuit will have a logical 0 value thereon when the associated movable contact S$t$ is connected with the stationary contact bar S$a$ and will have a logical 1 value thereon when the movable contact S$t$ is connected with the other contact bar S$b$. Any poor contact between the movable contacts S$t$1 to S$t$4 along the contact bars S$a$1 to S$a$4 or S$b$1 to S$b$4 does not result in a change in the logical output from the respective flipflops. By way of example, if a poor contact occurs between the movable contact S$t$1 and the contact bar S$b$1, the output of the flipflop formed by the pair of NAND gates N1 and N2 will be maintained at the value of logical 1, without changing to a logical 0 value. Similarly, a stable logical output signal is assured from the remaining flipflop circuits.

The alarm system also includes a circuit 102 which selects one of four threshold values for the running speed of the automobile. The selection circuit 102 comprises a pair of selection switches S$w$1 and S$w$2 which can be selectively turned on and off to provide a total of four combinations of binary signals. Specifically, the condition of the respective selection switches may be represented by a binary 0 and a binary 1, and using such designation, the combination of 0,0 corresponds to the first threshold value $V_1$, the combination of 0,1 to the second threshold value $V_2$, the combination of 1,1 to the third threshold value $V_3$, and the combination of 1,0 to the fourth threshold value. The selection switches S$w$1 and S$w$2 may be either manually operated or automatically operated in accordance with information contained in a record medium such as a magnetic cord or punched card. In certain circumstances, they may be controlled by an electromagnetic wave which is transmitted from outside the running automobile. One end of the switches is grounded while their other end is connected with the source of control voltage Vcc through resistors R9 and R10, respectively. Each of the other ends of the switches branches into a pair of paths C1, C2 and C3, C4, respectively, with the paths C2 and C4 including an inverter I1, I2, respectively.

The output from the selection circuit 102 is fed through the four paths C1 to C4 to a comparison and control circuit 103, which also receives the output from the detection circuit 100 through four paths C5 to C8. The comparison and control circuit 103 comprises a plurality of NAND gates N9 to N19 and a plurality of inverters I3 to I8, and is constructed such that when a coincidence is achieved betwen the output from the selection circuit 102 and the output from the detection circuit 100, it produces a corresponding output signal. In other words, the circuit 103 operates to see if a channel within the detection circuit 100 which has a greater threshold value than that selected by the selection circuit 102 conducts. Such manner of operation is achieved in the following manner: Assuming that the selection switches S$w$1 and S$w$2 in the selection circuit 102 are turned off to provide a combination of logical outputs 0,0 which corresponds to the threshold value $V_1$, the logical outputs on the paths C1 to C4 will be 0,1,0 and 1, respectively. Thus, only the gate N9 will have a logical 0 output while the other gates N10 to N12 will have a logical 1 output. Since the output of these NAND gates are connected with the inverters I3 to I6, the latter will have logical outputs of 1,0,0 and 0. When all of the outputs from the paths C5 to C8 of the detection circuit 100 are at logical 0 level, the outputs of NAND gates N13 to N16 will be all logical 1. However, when the running speed of the automobile exceeds the first threshold value $V_1$ established in the detection circuit 100, the output from the flipflop formed by the gates N1 and N2 will be inverted, providing a logical 1 output on the path C5. Consequently, the both inputs to the gate N13 will be logical 1's, so that its output will be logical 0. The logical outputs of 0,1,1 and 1 from the gates N13 to N16 are applied to two input NAND gates N17 and N18, respectively. The logical output from the gates N17 and N18 will be 1 and 0, respectively, which are applied to the inverters I7 and I8, respectively, producing logical 0 and 1 outputs for input to NAND gate N19. Thus, the gate N19 will produce an output of logical 1 which may be fed to a utilization device 105. It will be seen from the above description that when the logical outputs on the paths C1 to C4 from the selection circuit 102 and 0,1,0 and 1, respectively, the logical output from the gate N19 will be determined by the logical output from the first channel C5 of the detection circuit 100. More particularly, if the running speed of the automobile exceeds the second threshold value $V_2$ defined in the detection circuit 100 under this condition, the logical output on the path C6 or the second channel will assume a logical 1 level, but the logical output from the gate N14 which received such output from the path C6 remains unchanged. In the similar manner, when the logical output on the paths C1 to C4 from the selection circuit 102 are 0,1,1 and 0 corresponding to the second threshold value, the logical output of the gate N19 will be determined by the logical output on the path C6 from the detection circuit 100 alone; when the logical outputs on the paths C1 to C4 are 1,0,1 and 0, the logical output of the gate N19 will be determined by the logical value on the path C7; and when the logical outputs on the paths C1 to C4 are 1,0,0 and 1, the logical output of the gate N19 will be determined by only the logical value on the path C8.

In a preferred arrangement of the invention, the threshold value which is selected by the selection circuit 102 is displayed by taking logical signals from part of the comparison and control circuit 103 and feeding them as input signals to the base of transistors T$r$1 to T$r$4 which are contained in a threshold display circuit 104, thus selectively illuminating numerical displays $y$1 and $y$2. In the alarm system according to the invention, the utilization device 105 which is fed with an output signal from the comparison and control circuit 103 when the running speed of the automobile exceeds a threshold value selected by the selection circuit 102 may be used to provide an alarm to the car driver. Specific example of the utilization device 105 is shown in FIG. 3, where it is illustrated as a composite device serving several different purposes.

Figure 4:
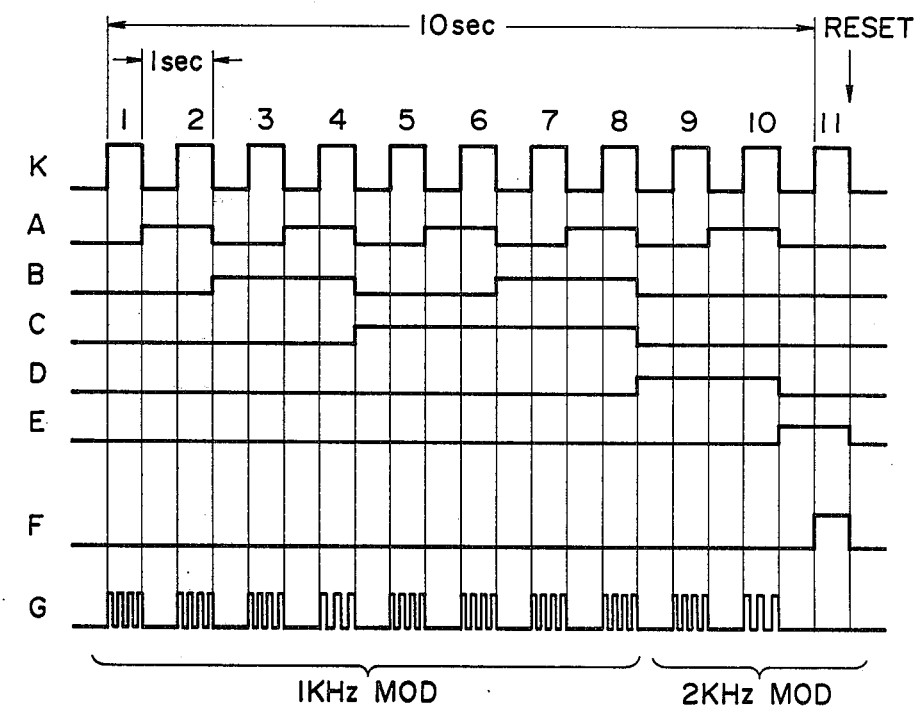
FIG. 4 is a series of graphs showing the waveform of various signals appearing in the circuit of FIG. 3.

As a first application of the utilization device, its use as a recorder which records the number of times or the time length during which the running speed of the automobile has exceeded a threshold value will be described first. In such an application, it is desirable that one count be based on a given time length during which the running speed of the automobile exceeds a threshold value since there must be a reasonable overspeed in excess of the threshold value to be permitted in order to accommodate the need for the automobile to outrun another car. An allowable overspeed interval of $t$ seconds may be most simply obtained by forming 1Hz pulses. In the example shown, there is provided an oscillator 106 having an oscillation frequency of 100KHz, the output of which is fed to a frequency divider 107 comprising a pair of decimal counter stages CS1 and CS2. The counter stage CS2 is in turn in cascade connection with another frequency divider 108 comprising three counter stages CS3 to CS5. The counter stage CS1 of the frequency divider 107 is a divide-by-10 counter, and provides an output frequency of 10KHz, which is applied to the input of another divide-by-10 counter stage CS2, thereby producing a 1KHz signal. The resulting signal is fed to an input control 109 which comprises an NAND gate N20 and an inverter I12. The gate N20 is enabled by the logical 1 output from the gate N19 of the comparison and control circuit 103 so as to pass the 1KHz output pulse from the frequency divider 107 to be applied as an input signal to the frequency divider 108. When the output from the gate N19 is a logical 1, the three decimal counter stages CS3, CS4 and CS5 of the frequency divider 108 frequency divides the input signal to produce a 1Hz signal at the output thereof. The 1Hz signal is fed to a timing circuit 110, which comprises a pair of decimal counter stages CS6 and CS7. The purpose of the timing circuit 110 is to establish an allowable overspeed time interval of $t$ seconds, which is assumed to be 10 seconds. When the 1Hz output signal from the frequency divider 108 is supplied to the input of the counter stage CS6 of the timing circuit 110, this counter stage initiates its counting operation producing a 4 bit binary coded output at its output terminals A, B, C and D, as shown by curves in FIG. 4 which are designated by corresponding characters. The input of the counter stage CS7 is connected with the D output of the counter stage CI6 for counting the D output of the counter stage CS6 which corresponds to each tenth 1Hz pulse. As a result, the counter stage CS7 produces a waveform as shown at E of FIG. 4. This output of the counter stage CS7 is fed to an overspeed frequency display 111, which comprises an NAND gate N21 which receives the 1Hz output signal from the counter stage CS5 of the frequency divider 108 and also receives the 11th 1Hz pulse (shown at F in FIG. 4) from the output E of the counter stage CS7 of the timing circuit 110, and passes the resulting output through an inverter I13 to the base of a transistor Tr6 so as to cause it to conduct. The conduction of the transistor Tr6 is effective to energize an electromagnetic numerical display counter m which is connected with a driver power source VP. The counter $m$ is associated with a manual resetting device 12 for permitting it to be reset in a mechanical manner.

It should be understood that the electromagnetic counter may be replaced by any known magnetic recorder.

A reset control circuit 113 is associated with the frequency divider 108 and the timing circuit 110. The circuit 113 includes an NAND gate N22 which receives outputs A and E from the timing circuit 110. When there is an output E, the logical value of an inverter I14 which is connected with the output of this gate will be a logical 1. The reset control circuit 113 also includes another inverter I15 and other NAND gates N23, N24 and N25 which are combined in a manner such that the reset inputs Re1 to Re5 to the frequency divider 108 and to the timing circuit 110 are automatically switched or controlled by the output from the gate N19 of the comparison and control circuit 103. Specifically, when the output from the gate N19 is a logical 0, the 1KHz output signal from the counter stage CS2 of the frequency divider 107 is supplied as Re1 to Re5 while when the output from the gate N19 is a logical 1, the output signal from the inverter I14 is supplied as reset signals Re1 to Re5.

Another application of the utilization device is to provide an alarm to the car driver by flashing an indicator lamp. This is illustrated in FIG. 3 as an indicator lamp control 114, which includes a transistor Tr5 having its base connected so as to receive the 1Hz pulse from the counter stage CS5 of the frequency divider 108 and having its collector-emitter path connected in series with a light emitting diode LED between the source of control voltage Vcc and the ground.

A further practical application of the utilization device is illustrated in FIG. 3 as an alarm tone generator 115 which is combined with a tone modulator 116. The tone modulator 116 includes a plurality of NAND gates N26 to N31 and a plurality of inverters I16 to I20 which are connected in a manner such that the alarm tone generator 115 produces an alarm of a different tone, when the counter stage CS6 of the timing circuit 110 has counted the ninth and tenth 1Hz pulses, from the tone which is produced when counting the first to eighth pulses. At this end, the gate N27 and the inverter I17 are connected to select the ninth and tenth pulses, while the first to eighth pulses are selected by the gate N26 and the inverter I16, which modulate the 1Hz pulse with the 1KHz pulses. NAND gates N28 to N30 and an inverter I18 are connected in a manner such that the gate N30 selectively passes the output signal from the inverter I16 or a 2KHz signal, which is obtained from the counter stage CS2 of the frequency divider 107 by providing a divide-by-5 operation, in response to the output signal from the inverter I17. In this manner, 1Hz output pulses modulated by 1KHz pulses are initially produced from the output of the gate N30, and then followed 1Hz pulses which are modulated by 2KHz pulses, as shown at G in FIG. 4. The output of the gate N30 represents an input signal to the alarm tone generator 115. Since it is unnecessary to produce an alarm tone at the time when the eleventh pulse which operates the overspeed frequency display 111 is produced, the output E from the counter stage CS7 of the timing circuit 110 and the output from the gate N30 are controlled by an NAND gate N31 and a pair of inverters I19 and I20. The alarm tone generator 115 is specifically a switched buzzer which is controlled by a transistor Tr7 connected in series with an output transformer TF having its secondary connected with a loudspeaker SP as a load.

While one particular embodiment of the invention has been specifically shown and described above, it should be understood that a number of variations and modifications may be made therein without departing from the scope and spirit of the invention. Specifically, while the frequency divider 108 is connected to the output of the gate control 109 for the convenience of describing the provision of the alarm tone modulator 116, it may be located at a position preceding the gate control for the convenience of operating lamp control 114 and the overspeed frequency display 111. In this instance, the oscillator 106 may be integrally combined with the frequency dividers 107 and 108. Therefore, it should be understood that the invention is not limited to the embodiment described, but is solely defined by the appended claims.

Having described the invention, what is claimed is:

1. An alarm system comprising
    (a) detection means including a drive unit movable with a variation in the magnitude of a physical quantity, a plurality of detection channels each having a predetermined threshold value different from the others, each channel comprising a movable conductor operatively connected with the drive unit for movement thereby and electrically connected with the ground, a pair of stationary conductors adapted to have a control voltage applied thereto and being engageable by said movable conductor during movement of the latter, and a flipflop circuit having a pair of input terminals connected with the respective stationary conductors, said movable conductor in each channel upon being moved by said drive unit from engagement with one of the stationary conductors into engagement with the other of said pair of stationary conductors causing said flipflop circuit to produce a binary signal representative of the magnitude of the physical quanity;
    (b) selection means for selecting a predetermined one of the threshold values in form of a binary signal and comprising a plurality of selection channels each associated with a detection channel of said detection means, means for applying a control voltage to each of the selection channels, and grounded switch means operatively connected with each of the selection channels for connecting a selected number thereof to ground providing thereby a binary signal representative of a selected threshold value;
    (c) comparison means for comparing, as input signals thereto, an output signal of the detection means with an output signal from the selection means and producing an electrical output signal when the magnitude of the physical quantity exceeds the threshold value selected by the selection means; and
    (d) a utilization device supplied with the electrical output signal from the comparison means to provide an alarm when the magnitude of the physical quantity exceeds the threshold value selected by the selection means.

2. An alarm system according to claim 1 in which the detection means includes a drive unit which is movable with a variation in the magnitude of the physical quantity, and wherein each of the detection channels comprises a movable conductor operatively connected with the drive unit and electrically connected with the ground, a pair of stationary conductors associated with the movable conductor, means for applying a control voltage to each of the stationary conductors, and a flipflop circuit having a pair of input terminals which are connected with the respective stationary conductors, said movable conductor being switched from contact with one of the stationary conductors to contact with the other stationary conductor to thereby operate the flipflop circuit when the magnitude of the physical quantity exceeds the corresponding threshold value.

3. An alarm system according to claim 2 in which the drive unit comprises a carriage, and guide rail means for the carriage, each movable conductor of the respective detection channels being carried by the carriage, and each pair of stationary conductors associated with each movable conductor being formed by a pair of bars which are disposed in alignment with the path of movement of the movable conductor.

4. An alarm system comprising
    (a) detection means including a drive unit movable with a variation in the magnitude of a physical quantity, a plurality of detection channels each having a predetermined threshold value different from the others, each channel comprising a movable conductor operatively connected with the drive unit for movement thereby and electrically connected to ground, a pair of stationary conductors adapted to have a control voltage applied thereto and being engageable by said movable conductor during movement of the latter, and a flipflop circuit having a pair of input terminals connected with the respective stationary conductors, said movable conductor in each channel upon being moved by said drive unit from engagement with one of the stationary conductors into engagement with the other of said pair of stationary conductors causing said flipflop circuit to produce a binary signal representative of the magnitude of the physical quantity;
    (b) selection means for selecting a predetermined one of the threshold values in form of a binary signal and comprising a plurality of selection channels each associated with a detection channel of said detection means, means for applying a control voltage to each of the selection channels, and grounded switch means operatively connected with each of the seletion channels for connecting a selected number thereof to ground producing thereby a binary signal representative of a selected threshold value;
    (c) comparison and control means for comparing, as input signals thereto, an output signal of the detection means with an output signal from the selection means and producing an electrical output signal when the magnitude of the physical quantity exceeds the threshold value selected by the selection means;
    (d) means for providing a train of pulses of a selected frequency;
    (e) means for gating the train of pulses in response to an output from the comparison and control means;
    (f) means for producing a timing pulse at a given time interval after the first one of the pulses in the train has passed through the gating means;
    (g) means for gating one of the pulses in the train which has passed the first mentioned gating means in response to the timing pulse; and (h) record means for recording the occurrence of said one pulse.

5. An alarm system according to claim 4 in which the frequency of the pulse trains is 1Hz.

6. An alarm system according to claim 4 in which said means for producing a timing pulse comprises a decimal counter having an input to which said initial pulse is applied.

7. An alarm system according to claim 4 in which said record means comprises an electromagnetic display counter including a switch which is rendered conductive by said one pulse.

8. An alarm system according to claim 4 in which the output from the frequency dividing means is a 1Hz pulse.

9. An alarm system comprising
(a) detection means including a drive unit movable with a variation in the magnitude of a physical quantity, a plurality of detection channels each having a predetermined threshold value different from the others, each channel comprising a movable conductor operatively connected with the drive unit for movement thereby and electrically connected to ground, a pair of a stationary conductors adapted to have a control voltage applied thereto and being engageable by said movable conductor during movement of the latter, and a flipflop circuit having a pair of input terminals connected with the respective stationary conductors, said movable conductor in each channel upon being moved by said drive unit from engagement with one of the stationary conductors into engagement with the other of said pair of stationary conductors causing said flipflop circuit to produce a binary signal representative of the magnitude of the physical quantity;
(b) selection means for selecting a predetermined one of the threshold values in form of a binary signal and comprising a plurality of selection channels each associated with a detection channel and said detection means, means for applying a control voltage to each of the selection channels, and grounded switch means operatively connected with each of the selection channels for connecting a selected number thereof to ground providing thereby a binary signal representative of a selected threshold value;
(c) comparison and control means for comparing as input signals thereto, an output signal of the detection means with an output signal from the selection means and producing an electrical output signal when the magnitude of the physical quantity exceeds the threshold value selected by the selection means;
(d) means for producing pulses of a selected frequency in succession;
(e) means for gating the pulses in response to an output from the comparison and control means;
(f) means for frequency dividing the pulses which have passed through the gating means;
(g) means for producing a timing pulse at a given interval after an initial output from the frequency dividing means;
(h) means for gating an output of the frequency dividing means in response to the timing pulse; and
(i) record means activated by an output from the last mentioned gating means.

* * * * *